Dec. 16, 1941.          E. BECKER          2,266,673
CONVEYER
Filed Jan. 7, 1939          2 Sheets-Sheet 2
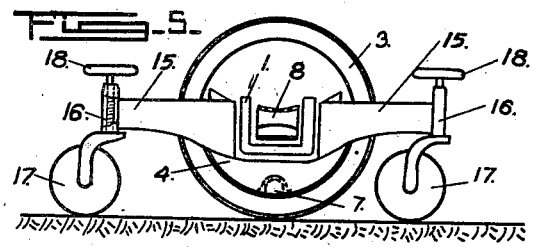
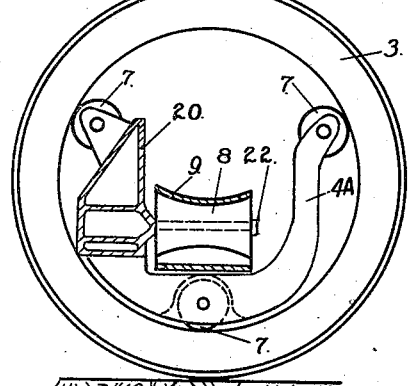
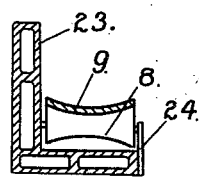
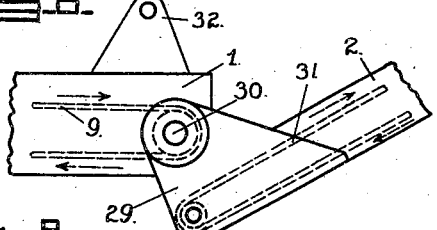
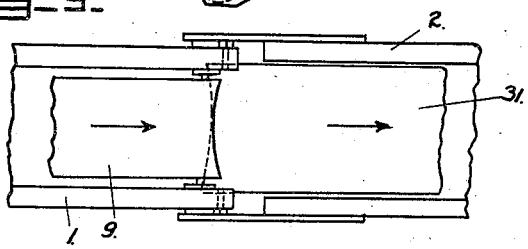
EMIL BECKER - INVENTOR
BY
          - ATTORNEY Patented Dec. 16, 1941

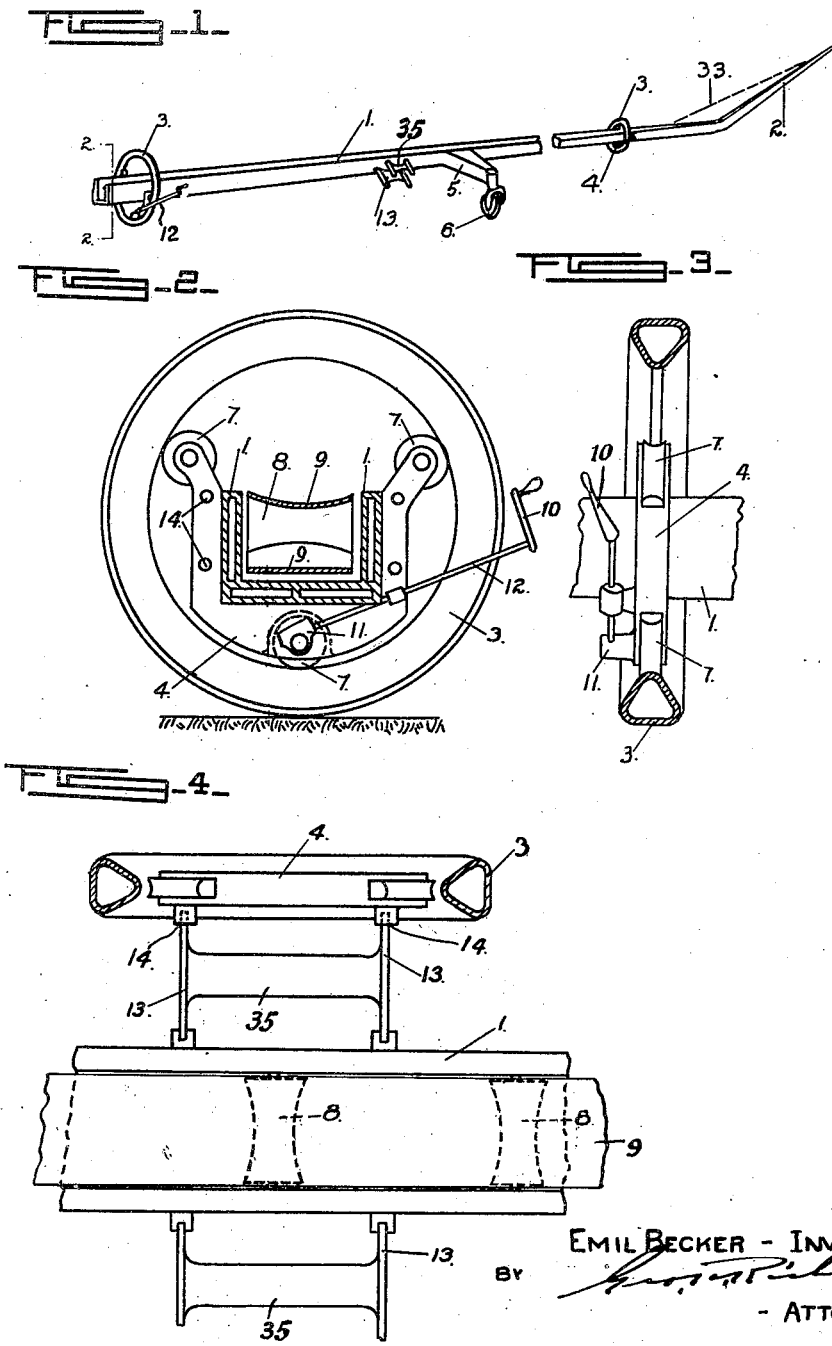

2,266,673

UNITED STATES PATENT OFFICE 2,266,673

CONVEYER

Emil Becker, Munich, Germany

Application January 7, 1939, Serial No. 249,753
In Germany November 22, 1937

9 Claims. (Cl. 198—233)

The invention relates to improvements in portable belt conveyer structures, and the object of the invention is to provide a belt conveyer structure of the type more particularly used in agriculture for the harvesting of root crops, and a particular object of the invention is to provide a conveyer belt supporting structure wherein such structure is mounted upon a plurality of ground engaging running wheels of relatively large diameter and capable of readily rolling over inequalities such as hummocks and depressions in a field surface.

A further object of my invention is to provide the ground engaging running wheels of rim-like form and to rotatably support the conveyer belt structure within the running wheel rims. A still further object of my invention is to furnish the conveyer structure with outwardly projecting arms which carry castor-like ground engaging wheels, such arms and wheels being provided to retain the conveyer belt structure against tipping movement within the rim-like running wheels.

With the foregoing and other objects in view as shall hereinafter appear, my invention consists of a portable belt conveyer constructed and arranged all as hereinafter more particularly described and illustrated in the accompanying drawings, in which, Figure 1 is a perspective view of my invention.

Figure 2 is an enlarged vertical cross-sectional view through the conveyer belt structure and showing one of the ground engaging rim-like running wheels in which the conveyer belt structure is carried.

Figure 3 is a vertical cross-sectional view through the running wheel as illustrated in Figure 2.

Figure 4 is an enlarged plan view of a fragmentary portion of the conveyer belt structure, a rim-like ground engaging running wheel being shown as removed from the encirclement of the conveyer belt structure and attached to the side of the structure whereby the structure can be rolled in the direction of its length.

Figure 5 is an end elevational view of a modification of my conveyer structure and showing my rim-like ground engaging running wheel and also a pair of arms projecting from the sides of the conveyer structure and furnished with a pair of castor-like ground engaging wheels, the arms and castor wheels retaining the conveyer belt structure from tilting or tipping.

Figure 6 is a similar view to Figure 2 showing a modified form of conveyer structure wherein the conveyer belt is mounted within a structure of substantially L-shaped cross-section instead of a structure of U-shaped cross-section as shown in the preceding views.

Figure 7 shows a further modified form of L-shaped conveyer structure.

Figure 8 is an enlarged side elevational view of a fragmentary portion of one end of the conveyer structure showing a separate inclined conveyer structure pivotally attached thereto, whereby material passing from the end of the main conveyer belt structure drops on the end of the secondary conveyer belt to be carried upwardly for loading into wagons or other structures at a higher elevation than the portable conveyer, and, Figure 9 is a plan view of the assembly shown in Figure 8.

Like characters of reference indicate corresponding parts in the different views of the drawings.

My conveyer, as illustrated in Figures 1, 2 and 3, comprises a channel girder 1 provided to contain the conveyer belt and positioned to lie in close proximity to the ground. The channel 1 is connected at one end to an upwardly inclined channel 2 which contains a conveyer belt adapted to receive material passing from the end of the conveyer belt in the channel 1, whereby material dropped on to the conveyer belt in the channel 2 is carried upwardly for loading into wagons or other structures at a higher elevation than the conveyer.

The channel 1 is contained within a plurality of rim-like ground engaging wheels 3. The rim-like wheels 3 are of relatively large diameter and each contain a U-shaped cradle member 4 carrying three rollers 7. The rim-like running wheels 3 are of substantially triangular cross-section with one flat face of the section engaging the ground, as illustrated in Figure 3, and the rollers 7 are formed with concave faces which engage the inner faces of the rims 3. The inner faces of the rims are, of course, relatively narrow as they form the apex portions of the triangular cross-section rims. Each U-shaped member 4 is provided with a roller on the upper end of each of its upright arms and a third roller upon its bottom. Each bottom roller 7 supports the weight of its member 4 upon its rim-like running wheel 3 and the upper rollers 7 retain the member 4 from twisting within the rim.

The channel member 1 is cradled within the U-shaped members 4, and to retain the channel 1 and U-shaped members 4 from swinging or tilting within the running wheel rims 3, the channel 1 is furnished with a horizontally projecting arm 5 which carries a castor-like ground engaging running wheel 6. The pivotal assembly of the running wheel 6 is mounted upon the outer end of the arm 5. The channel 1 contains a plurality of suitably spaced apart conveyer belt supporting pulleys 8, such pulleys being of narrow-waisted form, following standard practice, and carrying an endless conveyer belt 9. The conveyer belt 9 rests upon the upper faces of the pulleys in its material carrying travel and hangs under the pulleys in its return travel, following standard practice, and as illustrated in Figure 2.

The running wheel rims 3 can be rotated in any suitable manner to propel the conveyer assembly, and one method of propulsion can be achieved by utilizing the lower rollers 7 on the members 4 as driving wheels. For this purpose a worm drive 11 is suitably connected to each lower roller 7 and is operated by a driving shaft 12. For hand propulsion I show the upper end of the shaft 12 (Figure 2) provided with a handle 10. As the shaft 12 is rotated, it in turn rotates its pulley 7 and as such pulley 7 engages the inner face of the rim 3, the rim 3 will be rotated causing the conveyer structure to move either forwardly or rearwardly depending upon the direction of rotation of the shaft 12. If it is desired to move the conveyer in the direction of its length, the rim 3 and member 4 assemblies can be removed from the encirclement of the channel 1 and mounted upon the sides of the channel 1. This can be achieved by providing the sides of the channel 1 with one or more groups of horizontally projecting pins 13, each group of pins 13 being positioned to enter a group of orifices 14 in a member 4, as illustrated in Figure 4. Each pair of pins 13 is strengthened against bending by webs 35 extending therebetween.

Figure 5 shows a modification of my invention wherein it is unnecessary to remove the running wheel rims 3 and members 4 if it is desired to move the conveyer in the direction of its length. In this construction the frames 4 each carry two horizontally projecting arms 15. The outer end of each arm 15 is furnished with a castor-like ground engaging running wheel 17, and each running wheel 17 can be moved towards or away from its arm 15 by means of a suitable worm jack construction 16 operated by a hand wheel 18. It will thus be understood that upon operation of the hand wheel 18, the members 15 together with the entire conveyer assembly can be lifted upwardly from the ground and when it is desired to move the conveyer assembly in the direction of its length, the castor wheels 17 will swing, thus permitting the conveyer assembly to be moved in any direction across a field.

Figure 6 shows an alternative construction of the channel 1 and member 4 assembly. In this modification instead of carrying the channel 1 within the members 4, I provide an integral assembly wherein the U-shaped roller carrying members 4A are connected by a suitably constructed box girder 20 and from the side of which projects a plurality of shafts 22 carrying the belt supporting pulleys 8. It will thus be seen that one side of the conveyer belt 9 is more accessible than with the construction shown in Figure 2, and furthermore that the pulleys 8 and conveyer belt can be located closer to the ground.

Figure 7 is a slight modification of the construction shown in Figure 6 and wherein an L-shaped girder 23 is provided in lieu of the channel 1. The shafts supporting the pulleys 8 project from the side of the upright web of the channel and are supported at their outer ends by brackets 24. This construction has the same advantages as the construction shown in Figure 6 in that one side of the conveyer belt 9 is readily accessible.

Figures 8 and 9 are fragmentary views of one end of the conveyer structure and showing the manner in which the inclined channel 2 is pivotally connected to the channel 1. The end of the channel 2 adjacent to the channel 1 is formed with a pair of upwardly extending brackets 29 which lie on either side of the channel 1 and are pivotally connected thereto by a pin 30 extending through suitable orifices in the brackets 29 and in the end of the channel 1. The inclined channel 2 carries an endless conveyer belt 31, and as the end of the conveyer belt 31 is underneath the end of the conveyer belt 9 in the channel 1, material dropping off the end of the conveyer belt 9 will drop on to the conveyer belt 31 and be carried upwardly to be delivered into a wagon, truck or other elevated receptacle. If it is desired to reverse the operation and deliver material from the conveyer belt 31 on to the conveyer belt 9, it is necessary to position the channel 2 above the channel 1. For this purpose the channel 1 is provided with a pair of brackets 32 formed with orifices to receive the pin 30. It will thus be seen that instead of the channel 2 being supported below the conveyer belt 9 in the channel 1, that it will be supported above the channel 1 when the pin 30 is passed through the orifices in the brackets 32.

From the foregoing description it will be apparent that I have devised a portable conveyer of very simple construction wherein the conveyer belt is located in very close proximity to the ground. While the conveyer is particularly designed for agriculture and movement across rough, uneven fields, it can be readily adapted for many other uses.

What I claim as my invention is:

1. A portable belt conveyer structure comprising a girder, a conveyer belt, a plurality of conveyer belt supporting pulleys carried by the girder, a plurality of ground engaging running wheels of rim-like form and encircling the girder section, and roller elements interposed between the girder section and the rim.

2. A portable belt conveyer structure comprising a girder, a conveyer belt, a plurality of conveying belt supporting pulleys carried by the girder, a plurality of ground engaging running wheels of rim-like form and encircling the girder section, rollers carried by the girder section and engaging the inner peripheries of the running wheels, and means for rotating one of said rollers for imparting rotation to its running wheel.

3. A portable belt conveyer structure comprising a girder, a conveyer belt, a plurality of conveyer belt supporting pulleys carried by the girder, a plurality of ground engaging running wheels of rim-like form and encircling the girder section, the running wheels being of substantially triangular cross-section with one flat face of the section engaging the ground, and concave faced rollers carried by the girder section and engaging the inner apex portions of the running wheels.

4. A portable belt conveyer structure comprising a girder, a conveyer belt, a plurality of conveyer belt supporting pulleys carried by the girder, a plurality of ground engaging running wheels of rim-like form and encircling the girder section, the running wheels being of substantially triangular cross-section with one flat face of the section engaging the ground, concave faced rollers carried by the girder section and engaging the inner apex portions of the running wheels, and means for rotating one of said rollers for imparting rotation to its running wheel.

5. A portable belt conveyer structure comprising a girder, a conveyer belt, a plurality of conveyer belt supporting pulleys carried by the girder, a plurality of ground engaging running wheels of rim-like form and encircling the girder section, a plurality of cradle members in which the girder section is removably seated within the running wheels, rollers carried by the cradle members and engaging the inner peripheries of the running wheels, and means furnished on the side of the girder for receiving the cradles upon their removal from underneath the girder.

6. A portable belt conveyer structure comprising a girder, a conveyer belt, a plurality of conveyer belt supporting pulleys carried by the girder, a plurality of ground engaging running wheels of rim-like form and encircling the girder section, roller elements interposed between the girder section and the rim, a horizontal arm projecting from the side of the girder, and a castor-like ground engaging running wheel mounted upon the horizontal arm.

7. A portable belt conveyer structure comprising a girder, a conveyer belt, a plurality of conveyer belt supporting pulleys carried by the girder, a plurality of ground engaging running wheels of rim-like form and encircling the girder section, the running wheels being of substantially triangular cross-section with one flat face of the section engaging the ground, concave faced rollers carried by the girder section and engaging the inner apex portions of the running wheels, a horizontal arm projecting from the side of the girder, and a castor-like ground engaging running wheel mounted upon the horizontal arm.

8. A portable belt conveyer structure comprising a girder, a conveyer belt, a plurality of conveyer belt supporting pulleys carried by the girder, a plurality of ground engaging running wheels of rim-like form and encircling the girder section, roller elements interposed between the girder section and the rim, a pair of horizontal arms projecting from the sides of the girder, castor-like ground engaging running wheels mounted upon the horizontal arms, and means for moving said running wheels towards and away from their arms.

9. A portable belt conveyer structure comprising a girder, a conveyer belt, a plurality of conveyer belt supporting pulleys carried by the girder, a plurality of ground engaging running wheels of rim-like form and encircling the girder section, the running wheels being of substantially triangular cross-section with one flat face of the section engaging the ground, concave faced rollers carried by the girder section and engaging the inner apex portions of the running wheels, a pair of horizontal arms projecting from the sides of the girder, castor-like ground engaging running wheels mounted upon the horizontal arms, and means for moving said running wheels towards and away from their arms.

EMIL BECKER.